May 24, 1927. 1,630,217
F. O. RASOR
SPOTLIGHT
Filed Jan. 8, 1926 2 Sheets-Sheet 1
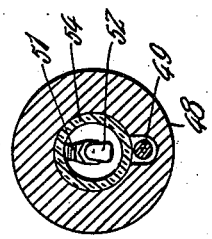
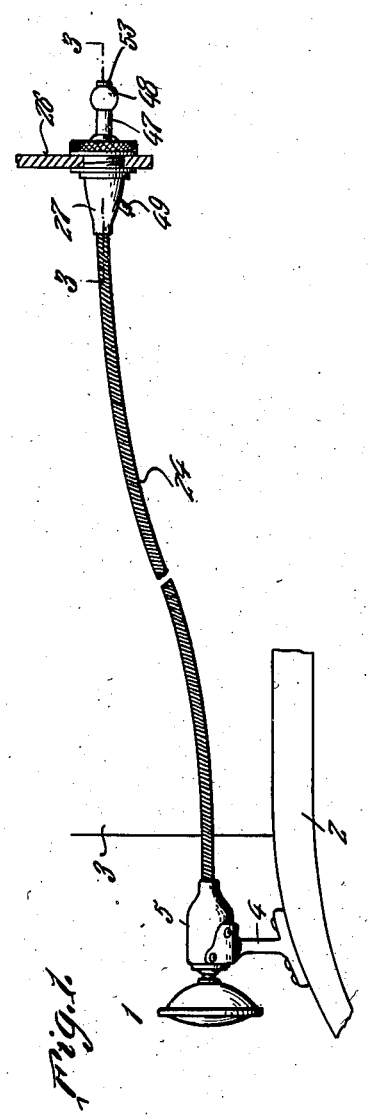
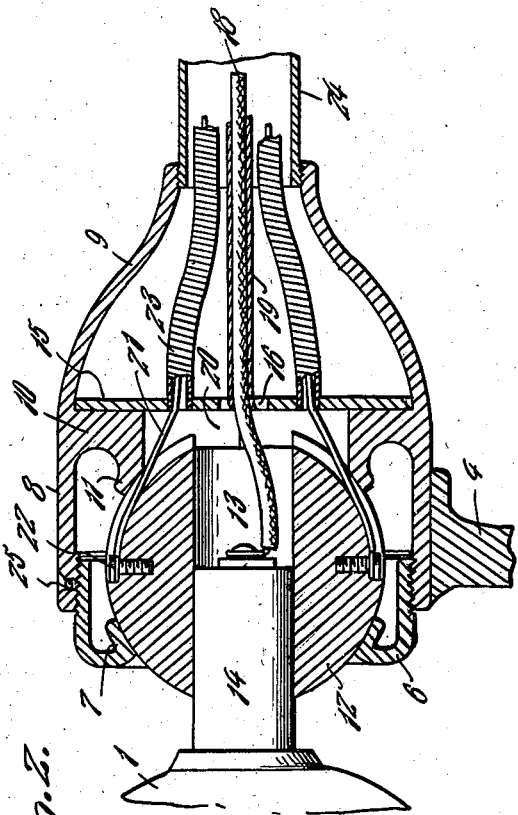
F. O. Rasor
INVENTOR
BY Victor J. Evans
ATTORNEY May 24, 1927.
F. O. RASOR
SPOTLIGHT
Filed Jan. 8, 1926
1,630,217
2 Sheets-Sheet 2
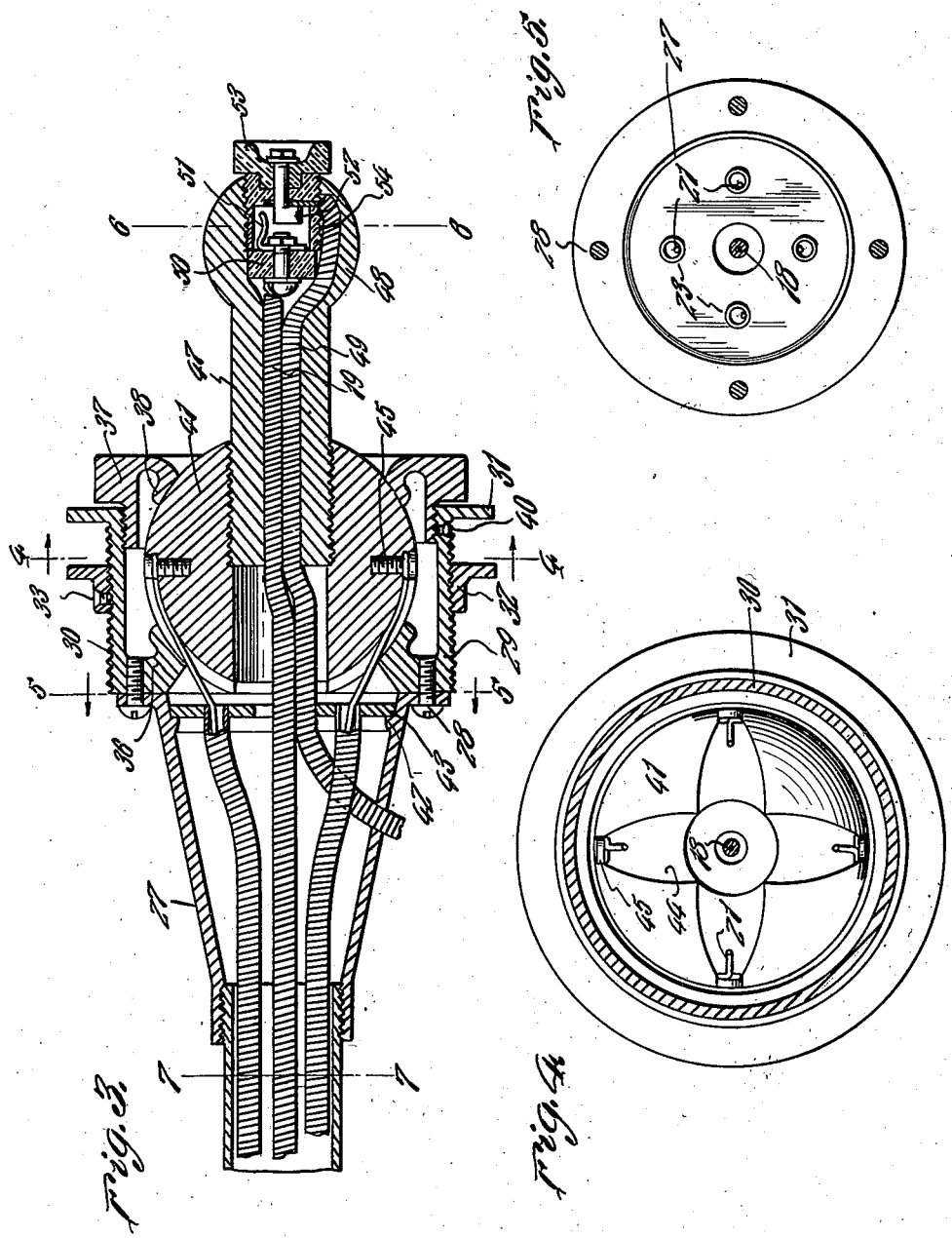

Patented May 24, 1927.

1,630,217

UNITED STATES PATENT OFFICE.

FLOYD O. RASOR, OF WESTERVILLE, OHIO.

SPOTLIGHT.

Application filed January 8, 1926. Serial No. 80,072.

The object of this invention is the provision of a spot light for automobiles or like vehicles and which means are operable from the interior of the vehicle for swinging the spot light to any desired angle as well as for igniting and extinguishing the lamp bulb therein.

A further object is the provision of an actuating and light controlling means for spot lights, characterized by simplicity in construction and reliability and efficiency in practical use.

To the attainment of the foregoing the invention consists in the improvement as hereinafter described and definitely claimed.

For a comprehensive understanding of the invention, reference is to be had to the drawings which accompany and form part of this application.

In the drawings:

Figure 1 is a side elevation of the improvement, with parts in section.

Figure 2 is a greatly enlarged vertical longitudinal sectional view through the housing or support for the spot light.

Figure 3 is a similar view substantially on the line 3—3 of Figure 1.

Figure 4 is a sectional view on the line 4—4 of Figure 3.

Figure 5 is a sectional view on the line 5—5 of Figure 3.

Figure 6 is a sectional view approximately on the line 6—6 of Figure 3.

Figure 7 is a sectional view approximately on the line 7—7 of Figure 3.

It is my purpose to support a spot light at the forward portion of an automobile or like vehicle, whereby road conditions ahead of the said vehicle can be accurately observed by the driver thereof. Ordinarily as is well known, spot lights are arranged directly on the windshield or the frame therefor. The arrangement of a spot light on the glass windshield frequently results in the breaking of the latter, as the weight of the spot light subjects the glass to the vibration which is imparted by the car while when the spot light is rotated upon the frame of the windshield it is necessary for the operator to extend his arm through the side of the car. Therefore, and as disclosed in Figure 1 of the drawings, the spot light 1 is supported on the top of one of the side frame members 2 of the automobile, forward of the radiator 3 and likewise forward of the steering wheels. The support for the spot light includes a bracket 4 to which is connected a housing 5 of a particular and peculiar construction. The housing 5 includes an outer flanged ring 6 provided, at its face, with an inwardly rounded annular flange 7. The ring member 6 is screwed in the threaded and rounded bore of the main or body member 8 of the housing. This member, for the major portion of its length, is round in cross section, its rear end being reduced and substantially cone-shaped, as at 9. At the juncture of the rounded body and the conical end 9 thereof, the member 8 is interiorly formed with an annular flange 10, the lower wall of which is extended outwardly and the face provided thereby is concaved and is round in plan. For distinction, this end of the flange 10 is indicated by the numeral 11. The concaved flanges 7 and 10 receive therebetween a ball or sphere 12 that is centrally formed with a longitudinal rounded opening 13 in which there is received a socket portion 14 of the spot light.

Contacting with the inner and straight face of the flange 10 there is a disc 15. This disc is centrally provided with an opening 16 and at points equidistant from the central opening with other rightangularly arranged openings 17. Through the opening 16 there is passed the encased conductor wire 18 that is connected to the bulb in the lamp casing 1. The wire 18 is directed through a tube 19.

The spherical member 12 may be of insulating material, and the same, on what I will term its inner face, is provided with equidistantly spaced rightangular depressions 20 in each of which there is received one end of a flexible shaft 21, the said flexible shafts being fixed in the grooves, at the center of the sphere 12 by removable means 22. All of the flexible shafts are received through flexible casings 23, and these casings are directed through a tube 24 which is also of flexible material. Any suitable means, such as indicated by the numeral 25, may be provided for removably connecting the sections of the housing 5, and by adjusting the outer or ring section 6 with respect to the fixed section 8 a proper contacting engagement is provided between the sphere 12 and the flanges 7 and 10, so that undue friction between these parts is prevented.

The protective or housing tube for the flexible shafts and for the wire 18, leads toward the instrument board 26 of the automobile and is screwed or otherwise removably fixed in the conical end 27 of a housing substantially similar to the housing previously described. The conical member 27 has its inner and widened end provided with an annular flange through which there are passed removable elements such as screws 28 that hold the cone 27 on what I will term the main or body member 29 of the mentioned housing 30. This housing 30 is round in cross section and is provided with exterior threads and with an inner annular flange 31. Screwed on the threaded periphery of the housing section 29 there is a flanged ring nut 32, and the housing 30 is passed through a suitable opening in the instrument board so that the flange 31 contacts with the inner face thereof, while the flange ring nut 32 is screwed on the housing and contacts with the outer face thereof. Suitable means 33 may bind the ring nut 32 in adjusted position on the housing, and also if desired, suitable means may pass through the flange of the ring nut, the flange 31 and the instrument board for effectively holding the housing on said board. The outer inwardly flanged end of the housing member 29, through which the bolt members 28 pass, has an extension 34 which is dished and which is round in plan.

The bore of the housing member 29 is, for a suitable distance from its inner end, threaded and screwed therein there is a ring member 37 that provides the second section of the housing. This ring member has at its outer open face an inwardly directed flange 38 which is dished and which is round in plan. Any suitable means, such as indicated by the numeral 40, may be employed for holding the housing sections 30 and 37 properly associated, and received in the said housing there is a spherical member 41, similar to the sphere 12. The spherical member 41 finds a bearing on the rounded and concaved faces of the flanges 36 and 38 and the adjustment of the housing section 37 with respect to the housing section 30 prevents undue frictional engagement between the flanges 36 and 38 and the said sphere 41.

The cone member 27 has an inner annular rib 42 against which rests a disc 43. The disc is provided with a central opening for the protective wire 18 and with equidistantly spaced rightangular openings for the second ends of the flexible casings 23 of the flexible shafts 21. These shafts 21 are received in rightangularly disposed notches 44 on what may be termed the outer face of the ball or sphere 41 and are removably secured to the said ball or sphere by means 45. The sphere 41 has a longitudinal bore 46 which is threaded for a portion of its length and screwed in the said bore there is one end of an operating handle 47. The outer end of the handle 47 is rounded to provide a knob 48. The handle has a bore therethrough in which the wire 18 is received, the said bore also receiving therethrough a second or ground wire 49 which leads through the bore 46 of the sphere 41 and passes through the cone 27, as well as to the battery of the car and from thence to the ground. In the bore and knob 48 there is an insulator plate 50 having a binding post for the wire 18 and having on its outer face a switch 51 associated with the binding post. The switch is in the path of a contact or second switch element 52 on a push button 53 that is movable through an insulator casing 54 in the said bore of the knob, and to this switch member or contact 52 the ground wire 49 is connected. It will be apparent that when pressure is exerted upon the push button 53 the switch elements will be brought together so that the circuit will be completed and the lamp bulb in the lamp housing 1 will be illuminated and likewise by moving the push button outwardly the circuit will be broken.

The simplicity and the advantages of the invention will, it is believed, be prefectly apparent to those skilled in the art to which this invention relates when the foregoing description has been carefully read in connection with the accompanying drawings. It will be apparent that by turning the knob 48 of the handle the ball 41 will be given a like motion so that the flexible shafts 21 will likewise turn the ball 12 and the spot light associated therewith. The elements 21 which I have termed the flexible shafts are in reality in the nature of piano wires or other light strong wires. By swinging or canting the handle 49 the lamp 1 will be subjected to a similar movement. All of the parts including the improvement are amply housed so that they will not be affected by weather conditions, and while I have herein set forth a satisfactory embodiment of my improvement as the same now appears to me it is to be understood that I am not to be limited to the structural feaures herein set forth and hold myself entitled to all such changes therefrom as fairly fall within the scope of what I claim.

Having described the invention, I claim:—

1. A spot light including a cylindrical body having internal screw threads at one end, a flanged ring threaded into said body, an inwardly rounded annular flange at the outer end of said ring, an inwardly projecting annular flange within the body having an outwardly extending portion formed with a concave face and round in plane, a ball positioned between the inwardly rounded flange and the flange on the body, said ball having a central longitudinal opening therethrough, a disk positioned against one face of the flange on the body and formed with a central opening and further formed with right angularly arranged openings in close proximity to the central opening, the inner end of said body being reduced and substantially cone-shaped, a conductor extending through the central opening in the disk and flexible shafts extending through the right angular openings and connected with the ball.

2. In a device for the purpose set forth, a spot light, a bracket support therefor, a two-part casing on the bracket, comprising members which have oppositely arranged rounded flanges, a ball head received between the flanges and to which the spot light is connected, said ball head having right angularly arranged grooves on the rear face thereof, a flexible shaft fixed in each groove, a disc in the casing through which the flexible shafts extend, flexible housings for the shafts, a housing tube for the last mentioned shaft, a second casing to which the last mentioned housing is connected, and in which the first mentioned flexible housings are received, said last mentioned casing comprising a plurality of adjustably connected sections, two of which having inwardlly directed flanges which are concaved, a disc in the casing to which the flexible housings are connected, a ball head on the concaved flanges of the casing, having grooves in which the flexible shafts are received and are fixed, and a handle member screwed in the ball head and extending through the casing, for the purpose set forth.

In testimony whereof I affix my signature.

FLOYD O. RASOR.